United States Patent [19]
Matsubaguchi et al.

[11] Patent Number: 5,413,868
[45] Date of Patent: May 9, 1995

[54] PERPENDICULAR MAGNETIC RECORDING MEDIUM COMPRISING A MAGNETIC THIN FILM OF COBALT, PALLADIUM, CHROMIUM AND OXYGEN

[75] Inventors: Satoshi Matsubaguchi; Akira Nahara, both of Kanagawa, Japan

[73] Assignee: Fuji Photo Film Co., Ltd., Kanagawa, Japan

[21] Appl. No.: 115,124

[22] Filed: Sep. 2, 1993

Related U.S. Application Data

[63] Continuation of Ser. No. 859,886, Mar. 30, 1992, abandoned.

[30] Foreign Application Priority Data

Mar. 28, 1991 [JP] Japan .................... 3-064973
Sep. 17, 1991 [JP] Japan .................... 3-236493

[51] Int. Cl.⁶ ............................... G11B 5/00
[52] U.S. Cl. ..................... 428/457; 428/336; 428/660; 428/668; 428/694 T; 428/694 TS; 428/900; 428/928; 148/313
[58] Field of Search ............ 428/336, 694, 900, 668, 428/694 T, 457, 660, 694 TS, 928; 148/313

[56] References Cited

U.S. PATENT DOCUMENTS

| | | | |
|---|---|---|---|
| 4,816,351 | 3/1989 | Takagi et al. | 428/694 |
| 4,929,514 | 5/1990 | Natarajan et al. | 428/611 |
| 4,950,548 | 8/1990 | Furusawa et al. | 428/611 |
| 5,024,854 | 6/1991 | Nakamura et al. | 427/38 |

FOREIGN PATENT DOCUMENTS

| | | |
|---|---|---|
| 60-126879 | 7/1985 | Japan . |
| 61-253622 | 11/1986 | Japan . |
| 01191318 | 8/1989 | Japan . |
| 02030104 | 1/1990 | Japan . |
| 3238617 | 10/1991 | Japan . |

*Primary Examiner*—Stevan A. Resan
*Attorney, Agent, or Firm*—Sughrue, Mion, Zinn, Macpeak & Seas

[57] ABSTRACT

A magnetic recording medium comprising a nonmagnetic substrate having thereon a magnetic layer, wherein the magnetic layer is a metal thin film comprising mainly a composition represented by the formula: $(Co_{100-x}Pd_x)_{100-y}Cr_y$ or $[(Co_{.100-x}Pd_x)_{100-y}Cr_y]_{100-z}O_z$ wherein x, y and z are atomic percents, and $10 \leq x \leq 40$, $5 \leq y \leq 25$ and $0.5 \leq z \leq 15$. The present medium can be produced at low costs, and has excellent perpendicular magnetic anisotropy.

6 Claims, 4 Drawing Sheets

PERPENDICULAR MAGNETIC RECORDING MEDIUM COMPRISING A MAGNETIC THIN FILM OF COBALT, PALLADIUM, CHROMIUM AND OXYGEN

This is a Continuation of application Ser. No. 07/859,886, filed Mar. 30, 1992, now abandoned.

FIELD OF THE INVENTION

The present invention relates to a magnetic recording medium comprising a magnetic layer formed by a metal thin film and more particularly to a magnetic recording medium in which magnetic characteristics are improved by changing the composition of the magnetic layer and thus making it suitable for use in perpendicular magnetic recording.

BACKGROUND OF THE INVENTION

To comply with the current demand for high density recording, improvement of a magnetic recording medium is now under extensive investigation. The most promising medium that can be expected to increase in recording density is the so-called metal thin film type of medium in which a metal thin film is used as a magnetic layer.

Magnetic recording systems can be roughly divided into two types: longitudinal magnetic recording that has an axis of easy magnetization in the longitudinal direction of the magnetic layer surface (i.e., which is magnetized in the direction parallel to the magnetic layer surface), and perpendicular magnetic recording that has an axis of easy magnetization in the perpendicular direction of the magnetic layer surface (i.e., which is magnetized in the direction perpendicular to the magnetic layer surface). Various improvements in magnetic material compositions, layer constructions and film-forming methods depending on the respective recording systems have been proposed for a magnetic recording medium which has a metal thin film as the magnetic layer. Compositions known to comprise the thin film magnetic recording layer for the longitudinal magnetic recording include CoNi, CoNiCr, etc. When forming a thin film as the magnetic layer using the known composition according to the usual magnetron sputtering method, it is necessary to carry out the sputtering while heating a nonmagnetic substrate at a temperature range of from about 100° to about 350° C. in order to increase coercive force.

Compositions known to comprise the thin film magnetic recording layer of the perpendicular magnetic recording include CoCr, CoCrTa, etc. In the film formation according to the usual magnetron sputtering method, it is necessary to heat the nonmagnetic substrate at a temperature of not less than 100° C. in order to obtain perpendicular magnetic anisotropy. In the case of the vacuum deposition method, heating at a much higher temperature is needed.

When heating the nonmagnetic substrate in the formation of the magnetic metal thin film, a film-forming apparatus is needed which is complicated in structure, and limits the type of the nonmagnetic substrate that can be used. For example, plastic materials such as a polyethylene terephthalate film are unsuitable for use.

Known materials that provide a high coercive force even in film formation at low temperatures include a CoPt-based longitudinal magnetic recording film and a CoPtBO-based perpendicular magnetic recording film (JP-A-2-74012, etc.) (the term "JP-A" as used herein refers to a "published unexamined Japanese patent application"). The Pt-based material, however, has a problem of being expensive for practical use.

A CoPd-based metal thin film is inexpensive as compared with the Pt-based material and can provide a high coercive force even in film formation at low temperatures, and is disclosed in, for example, JP-A-1-191318 and JP-A-2-30104. However, Pd is needed in a proportion of not less than 60% and, therefore, the CoPd-based material is still expensive. Moreover, the saturation magnetization Ms of the material is about 400 emu/ml, and thus the material does not have sufficiently satisfactory magnetic characteristics.

J. Appl. Phys., 52 (3), 2453 (1981) describes the magnetic anisotropy of a Co—Cr-based metal thin film as the magnetic film of the perpendicular magnetic recording. In this report, alloy thin films in which small amounts of Pd and Rh are added to the Co—Cr are disclosed but with only small improvements to the above cited problems.

SUMMARY OF THE INVENTION

An object of the present invention is to provide a metal thin film type magnetic recording medium in which the metal thin film can be formed without increasing the temperature of the nonmagnetic substrate, and which has excellent magnetic characteristics where the coercive force is high and the saturation magnetization is high.

Another object of the present invention is to provide a metal thin film type magnetic recording medium for the perpendicular magnetic recording having an axis of easy magnetization in the direction substantially perpendicular to the magnetic layer surface which is relatively inexpensive in the cost of material.

Still another object of the present invention is to provide a magnetic recording medium for perpendicular magnetic recording which has excellent perpendicular magnetic anisotropy.

The present invention relates to a magnetic recording medium comprising a nonmagnetic substrate having thereon a magnetic layer, wherein the magnetic layer is a metal thin film made mainly of a composition represented by the formula: $(Co_{100-x}Pd_x)_{100-y}Cr_y$ wherein x and y are atomic percents and are in the ranges of $10 \leq x \leq 40$ and $5 \leq y \leq 25$.

In addition, the present invention relates to a magnetic recording medium comprising a nonmagnetic substrate having thereon a magnetic layer, wherein the magnetic layer is a metal thin film comprising mainly a composition represented by the formula: $[(Co_{100-x}Pd_x)_{100-y}Cr_y]_{100-z}O_z$ wherein $10 \leq x \leq 40$, $5 \leq y \leq 25$, $0.5 \leq z \leq 15$, and x, y and z are atomic percents.

DETAILED DESCRIPTION OF THE INVENTION

Figure 1:
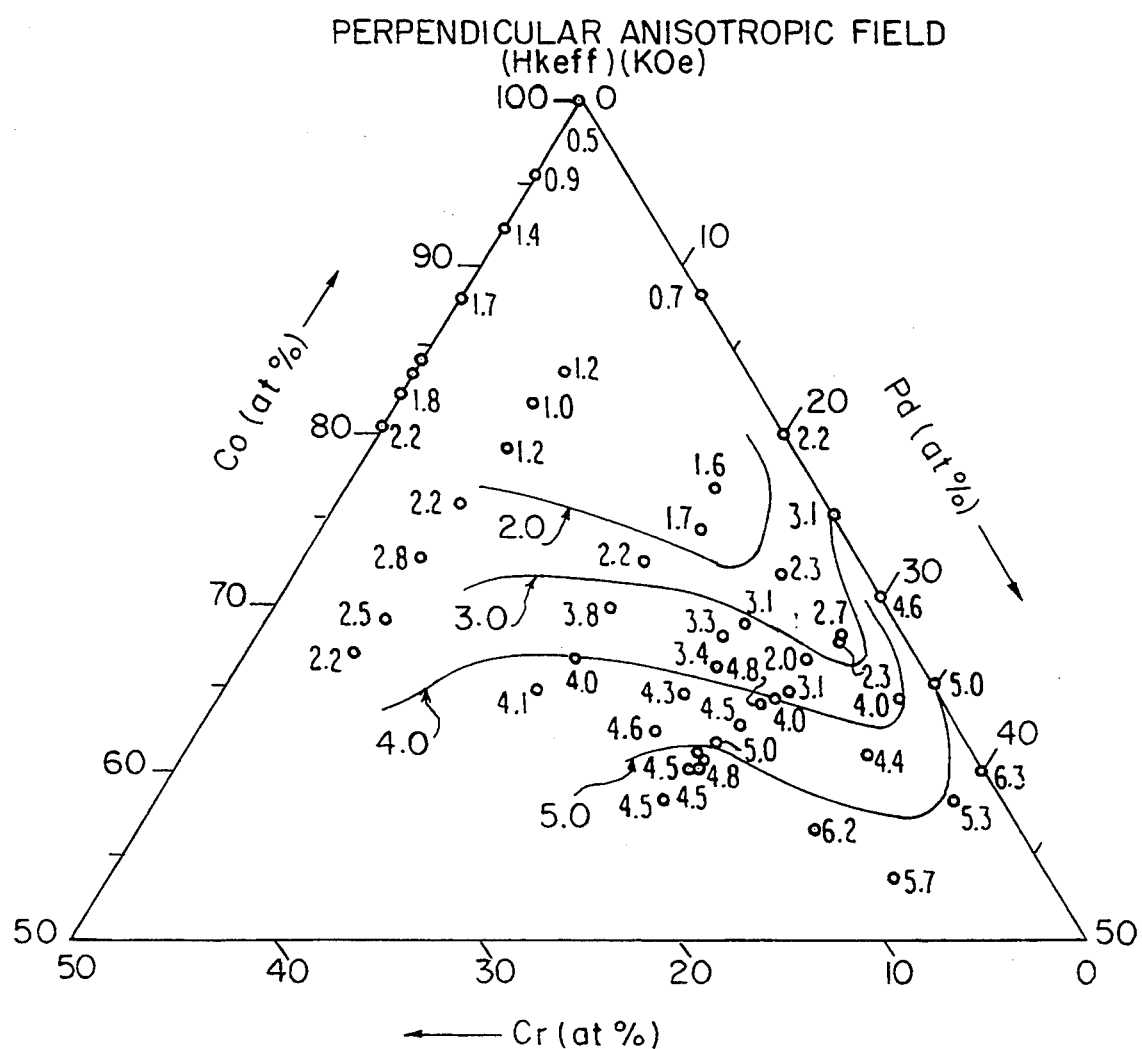
FIG. 1 shows the relation between the ternary system composition of the CoPdCr metal thin film and the perpendicular anisotropic field Hkeff of the magnetic layer.

In the magnetic recording medium of the present invention, the metal thin film as the magnetic layer is made of a composition resulting from the addition of a specified range of Cr to a Co—Pd-based alloy in a specified composition range. Thus, the metal thin film magnetic layer has improved magnetic characteristics, and it provides an excellent medium particularly in terms of perpendicular magnetic anisotropy. Moreover, since the composition is composed mainly of a Co—Pd based alloy, it is not necessary to increase the temperature of the non-magnetic substrate in the film formation. Thus, the process of production of the medium is simplified, the production costs are relatively low, and as the heat resistance required for the nonmagnetic substrate is reduced, the range of selection of materials for the substrate can be increased.

It is believed that because the magnetic anisotropy is induced by the inverse magnetostrictive effect generated by addition of Pd to the Co in the metal thin film as the magnetic layer, a magnetic film which exhibits excellent magnetic anisotropy can be obtained without increasing the temperature of the nonmagnetic substrate.

It is also believed that because the addition of Cr increases grain boundary separability by the segregation effect, the magnetic characteristics can be improved, and one can obtain a metal thin film exhibiting excellent perpendicular magnetic anisotropy.

The composition of the metal thin film in the magnetic recording medium of the present invention is represented by: $(Co_{100-x}Pd_x)_{100-y}Cr_y$. The atomic ratio (at. %), y, of Cr to the Co—Pd base alloy is from 5 to 25 at. % and preferably from 10 to 20 at. %. If the amount of Cr present is too large, Ms is decreased, and if the amount of Cr present is too small, the perpendicular anisotropic field (Hkeff) which becomes a measure of perpendicular magnetic recording is not sufficiently increased, and one cannot obtain a medium with excellent perpendicular magnetic anisotropy. The practical value of the perpendicular anisotropic field (Hkeff) is more than 3.5.

The atomic ratio (at. %), x, of Pd to Co in the Co—Pd based alloy of the composition for the magnetic layer of the present invention is from 10 to 40 at. % and preferably from 10 to 30 at. %.

If the amount of Pd present is too large, the coercive force Hc in the perpendicular direction is decreased, and if the amount of Pd present is too small, the above Hkeff is not sufficiently increased.

In accordance with the present invention, the metal thin film as the magnetic layer of the magnetic recording medium is made of a composition comprising the ternary system of Co—Pd—Cr, the composition ratio of components being in the above specified ranges, whereby a magnetic recording medium with excellent perpendicular magnetic anisotropy having various production advantages can be obtained.

The thickness of the metal thin film as the magnetic layer of the present invention is usually in the range of 200 to 10,000 Å.

In order to increase the advantageous characteristics of the thin film magnetic layer, as well as the above composition components, not more than 15 at. % of elements such as oxygen, nitrogen, carbon, inert gases, metals or semi metals may be added thereto within the range that does not deteriorate the effect of Pd and Cr addition. If oxygen among the above elements is added in an amount of generally 0.5 to 15 at. %, preferably 1 to 10 at. %, to the thin film magnetic layer of the above composition, the perpendicular magnetic anisotropy can be increased to a greater extent.

Introduction of oxygen into the metal thin film of the composition represented by the formula: $(C_{100-x}Pd_x)_{100-y}Cr_y$ wherein $10 \leq x \leq 40$, $5 \leq y \leq 25$, and x and y are atomic percents (at. %), results in a metal thin film of the composition represented by the formula: $[(Co_{100-x}Pd_x)_{100-y}Cr_y]_{100-z}O_z$ wherein $10 \leq x \leq 40$, $5 \leq y \leq 25$ and $0.5 \leq z \leq 15$, and x, y and z are atomic percents (at. %), leading to an increase in the effect of separating grain boundaries among magnetic grains forming the metal thin film. Thus, the magnetic anisotropy is increased, and one can obtain a metal thin film which has large perpendicular coercive force and is most suitable as a magnetic recording medium for perpendicular magnetic recording having an axis of easy magnetization in direction perpendicular to the magnetic layer surface.

If the oxygen content is too large, magnetic characteristics themselves are decreased, and if the oxygen content is less than 0.5 at. %, the above effect due to oxygen tends to be obtained with difficulty.

An increase of the oxygen content is particularly not desirable because it leads to a decrease in saturation magnetic flux density.

Factors x and y indicating the atomic percents of the metal elements in the above composition formula are determined by quantitatively measuring the composition of the metal thin film by an X-ray fluorescence (XRF) calibrated by the inductively coupled plasma (ICP) analysis.

In contrast, z indicating the atomic percent of oxygen is determined from a profile in the depth direction of the film as obtained by the Auger electron spectroscopy (AES).

By providing a nonmagnetic layer between the magnetic layer of the above composition and the nonmagnetic substrate in the magnetic recording medium of the present invention, one can obtain a magnetic layer which has a more greatly increased coercive force.

As the above nonmagnetic layer, a thin film of metals such as Cr, Mo, W, V, Nb, Ta, Si, Ge and Ti, or their oxides, nitrides or carbides can be used.

The use of metal elements of Cr, Mo, W, V, Nb, Ta, Si, Ge and Ti, or their oxides, nitrides or carbides in the formation of the above nonmagnetic layer increases the perpendicular magnetic anisotropy of the metal thin film to be formed on the nonmagnetic layer.

It is believed that the nonmagnetic layer provided on the nonmagnetic substrate has an epitaxial effect or an effect of preventing incorporation of impurities from the nonmagnetic substrate into the magnetic thin film, thereby facilitating the formation of the magnetic layer of the structure that has excellent perpendicular magnetic anisotropy.

The thickness of the nonmagnetic layer is preferably in the range of 200 to 10,000 Å. For the formation of the nonmagnetic layer, vacuum deposition methods such as sputtering or vacuum evaporation are preferably employed as the formation of the magnetic layer, because the effects of the nonmagnetic layer are sufficiently obtained in the resulting thin film magnetic recording layer.

The metal thin magnetic layer of the magnetic recording medium of the present invention can be formed by vacuum deposition methods such as sputtering or vacuum evaporation.

An alloy thin film of the predetermined composition can be formed by sputtering technique using an alloy target having a composition similar to that of the thin film, or by co-sputtering technique using a plurality of targets (multi-concurrent sputtering).

In particular, the latter multi-concurrent sputtering is preferably employed for the production of the magnetic recording medium of the present invention, because separability of grain boundary is increased and thus magnetic anisotropy is easily induced. For example, by co-sputtering using a combination of a Co—Pd alloy target and a Cr target, the segregation effect of Cr is increased and a metal thin film with excellent magnetic anisotropy can be obtained.

In respect to the introduction of oxygen into the metal thin film, oxygen may be previously added to any of the above target compositions, or to the starting material for vacuum deposition, or by introducing a gas containing a small amount of oxygen into a vacuum gas atmosphere in the course of the film formation.

Usually the introduction of oxygen can be carried out by introducing a gas mixture of an inert gas, such as Ar, and a small amount of oxygen, into the vacuum chamber.

For the formation of the magnetic recording medium of the present invention, the above multi-concurrent sputtering method is preferably employed, because the separability of grain boundaries is increased and thus the magnetic anisotropy is easily induced. For example, when two component concurrent sputtering is carried out in a vacuum atmosphere containing a small amount of oxygen, using a combination of a Co—Pd alloy target and a Cr target, the segregation effect of oxygen is increased and thus a metal thin film with excellent magnetic anisotropy can be obtained.

In order to increase the beneficial characteristics of the thin film magnetic recording layer, it is desirable that the remaining gas atmosphere in a vacuum during the process of sputtering, the substrate temperature, the removal of materials adsorbed on the surface of the substrate, the reduction of removal of gas from the substrate, the film forming speed, and so forth are optimized.

Since it is believed that the effect of magnetostriction due to the internal stress in the thin film magnetic recording layer is operative in the present invention, and that magnetic characteristics obtained is varied with the pressure of inert gas in the vacuum chamber during film formation at the time of sputtering, it is desirable that care be taken in controlling the gas pressure.

For example, when Ar is used as the inert gas, the Ar gas pressure is preferably at least $5 \times 10^{-3}$ Torr and further oxygen gas pressure is preferably not more than $2 \times 10^{-4}$ Torr.

Nonmagnetic substrates made of metals such as Al and its alloys, glass, ceramics and synthetic resins, or nonmagnetic substrates subjected to surface treatment and having a subbing layer can be used for the magnetic recording medium of the present invention. For example, Al base alloys, Al substrates with an Ni—P subbing layer, various reinforced glasses, various ceramics, polyethylene terephthalate, polyimide, polyetherimide, and organic or inorganic composite materials can be used.

Since it is not necessary to heat the nonmagnetic substrate to a high temperature at the time of film forming, a material having low heat resistance such as plastics can be employed in the present invention.

In connection with the shape of the nonmagnetic substrate, a disc-form, a tape-form and the like can be employed.

In addition, one can employ a so-called two layer structure type in the perpendicular magnetic recording medium in which a low coercive magnetic layer having an axis of easy magnetization in the longitudinal direction of the magnetic layer surface is provided, directly or through an intermediate layer, under the thin film magnetic recording layer having a perpendicular magnetic anisotropy.

The low coercive magnetic layer is preferably a longitudinal magnetic recording film having an interlayer coercive force of not more than 100 Oersteds, with a soft magnetic thin film having a high permeability being particularly preferred. For example, thin films of Permalloy base alloys such as Co—Cr—Ta, Co—Cr—Nb, Co—Nb—Zr, and so forth can be used.

The thickness of the above described low coercive magnetic layer is chosen from a range of 200 to 10,000 Å.

Although the plating method can be used as the film forming method, vacuum film forming methods such as sputtering and vacuum evaporation are preferably used.

A material and a film structure similar to those of the above nonmagnetic layer can be employed as the above intermediate layer.

For a more efficient practice of the present invention, a protective layer and a lubricant layer may be provided on the thin film magnetic layer. Examples of the protective layer are a carbon thin film, an oxide film, a nitride film, a carbide film, a metal thin film, an alloy thin film and so forth. In the lubricant layer, various compounds known as lubricants for a metal thin film type magnetic recording medium can be used. Of these compounds, a perfluorocarbon based lubricant is preferred from the viewpoint of its lubricating effect.

By specifying the element composition to $(Co_{100-x}Pd_x)_{100-y}Cr_y$ wherein $10 \leq x \leq 40$, $5 \leq y \leq 25$, where x and y are atomic percents (at. %) in the magnetic recording medium with a thin film of Co—Cr—Pd base alloy as a magnetic layer, one can obtain a magnetic recording medium having a high coercive force, particularly a magnetic recording medium having excellent perpendicular magnetic characteristics, without the need to increase the temperature of the nonmagnetic substrate at the time of film formation.

By employing a metal thin film made of a composition represented by the formula: $[(Co_{100-x}Pd_x)_{100-y}Cr_y]_{100-z}O_z$ wherein $10 \leq x \leq 40$, $5 \leq y \leq 25$, $0.5 \leq z \leq 15$, and x, y and z are atomic percents (at. %) as derived by introducing elemental oxygen into the metal thin film of the above composition, the perpendicular magnetic anisotropy can be increased.

The use of Pd, which is relatively inexpensive, in combination with the above low temperature formed film permits the manufacture of a magnetic recording medium which is extremely favorable from an economic standpoint.

The present invention is described in greater detail with reference to the following examples which should not be construed as limiting the scope of the present invention. Unless otherwise indicated herein, all parts, percents, ratios and the like are by weight.

EXAMPLE 1

An alloy target having the composition of $Co_{80}Pd_{20}$ (at. %) and a diameter of 125 mm, and a Cr target were placed in a vacuum chamber of a Magnetron Sputtering Apparatus.

The degree of vacuum (background), PBG, in the vacuum chamber before the start of sputtering was $1 \times 10^{-6}$ Torr.

Then, an argon gas was introduced into the vacuum chamber, and co-sputtering was conducted in an atmosphere of $10 \times 10^{-3}$ Torr to form a 2,000 Å thick CoPdCr alloy thin film on a glass substrate.

By applying an RF electric power of 2.0 KW to the $Co_{80}Pd_{20}$ target and a DC electric power of 0 to 300 W to the Cr target, the composition of the metal thin film obtained was varied.

The composition of the metal thin film thus produced was quantitatively determined by XRF (X-ray fluorescence analysis) calibrated by ICP (Inductively Coupled Plasma Analysis). The results obtained are shown in Table 1.

TABLE 1

| | Electric Power Applied to Cr Target (W) | | | | | | | | |
|---|---|---|---|---|---|---|---|---|---|
| | 0 | 38 | 76 | 110 | 152 | 171 | 210 | 250 | 300 |
| Co Composition (at. %) | 80 | 76 | 74 | 72 | 69 | 67 | 65 | 60 | 56 |
| Pd Composition (at. %) | 20 | 19 | 19 | 18 | 17 | 17 | 16 | 15 | 14 |
| Cr Composition (at. %) | 0 | 5 | 7 | 10 | 14 | 16 | 19 | 25 | 30 |
| Ratio of Co to Pd (atomic number ratio) | 80/20 | 80/20 | 80/20 | 80/20 | 80/20 | 80/20 | 80/20 | 80/20 | 80/20 |

The results of Table 1 illustrate that in the CoPdCr based alloy thin film as produced above, Cr in proportion to the film forming power of Cr was introduced into the metal thin film while keeping the ratio of Co:Pd=80:20.

EXAMPLES 2 TO 6

Magnetic recording media were produced by forming a magnetic layer of the respective composition described below on the glass substrate in the same manner as in Example 1 except that the $Co_{80}Pd_{20}$ target was replaced by $Co_{90}Pd_{10}$ (Example 2), $Co_{70}Pd_{30}$ (Example 3), $Co_{75}Pd_{25}$ (Example 4), $Co_{65}Pd_{35}$ (Example 5) or $Co_{60}Pd_{40}$ (Example 6).

COMPARATIVE EXAMPLE 1

A magnetic recording medium was produced in the same manner as in Example 1 except that the $Co_{80}Pd_{20}$ target was replaced by Co.

Figure 2:
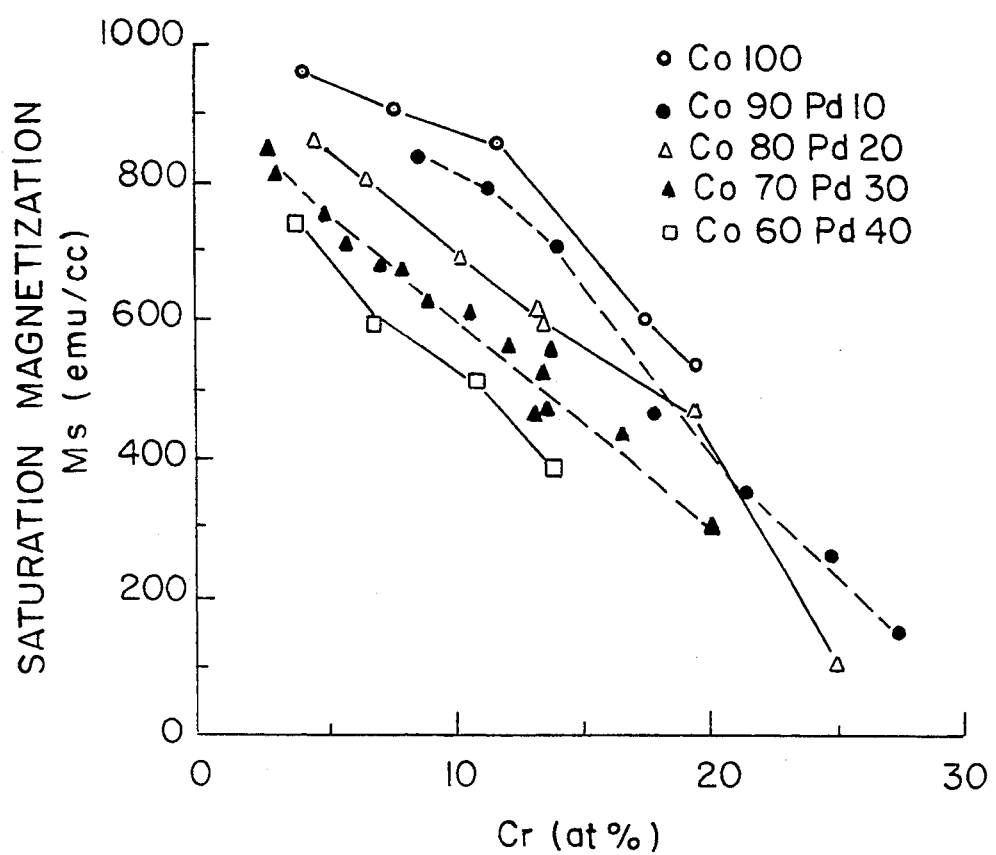
FIG. 2 shows the relation between the ternary system composition of the CoPdCr metal thin film and the saturation magnetization Ms.
Figure 3:
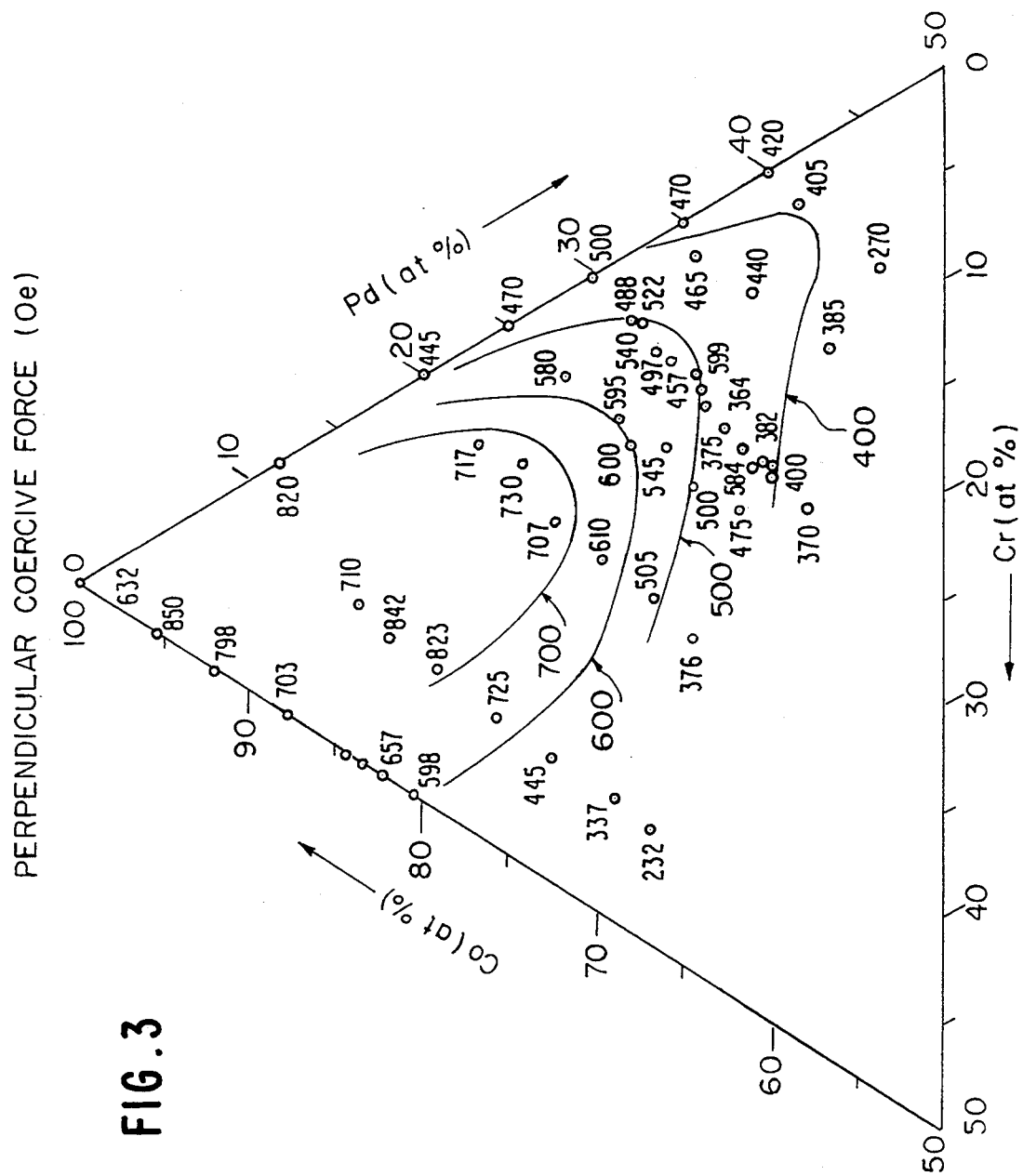
FIG. 3 shows the relation between the ternary system composition of the CoPdCr metal thin film and the coercive force Hc in a direction perpendicular to the film surface.

The magnetic characteristics of the magnetic recording media as obtained above were measured by the use of a vibration sample type of magnetometer (VSM). The results obtained are shown in FIGS. 1 to 3.

Perpendicular anisotropy was determined by measuring the effective perpendicular anisotropic field Hkeff from hard axis (in-plane) M-H loop.

Figure 4:
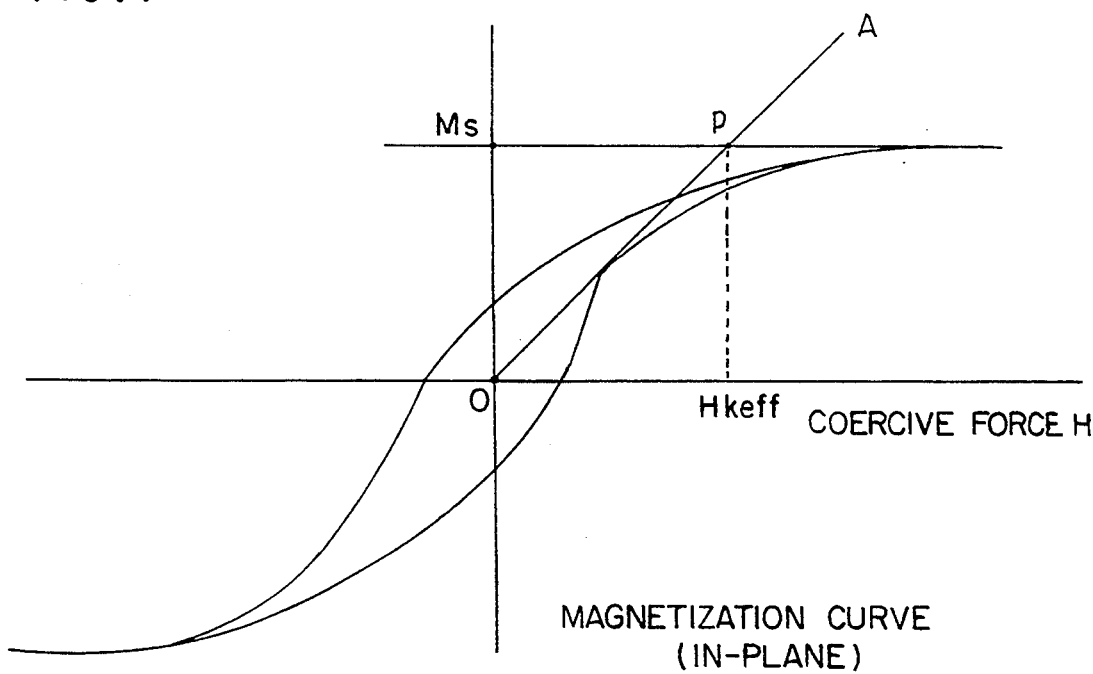
FIG. 4 is a view illustrating a way of determining the perpendicular anisotropic field Hkeff.

Measurement of the above perpendicular anisotropic field Hkeff was conducted by the method described in IEEE Trans. Magn. 23 (5), 2443 (1987). Hkeff was defined as the coercive force H at the point of intersection P of tangent A drawn from the original point 0 of the magnetization curve in the longitudinal direction of the metal thin film magnetic layer of the magnetic recording medium shown in FIG. 4, and straight line M=Ms in parallel to the abscissa axis, H (coercive force).

FIG. 1 illustrates the relationship between the ternary system of the CoPdCr metal thin film and the perpendicular anisotropic field Hkeff. In FIG. 1, figures besides the dots indicate the measured values of perpendicular anisotropic field (indicated in the unit of K Oe) at the respective compositions. Equimagnetic field curves at Hkeff of 2.0, 3.0, 4.0 and 5.0 as read from the measured points are also shown in FIG. 1.

It was confirmed from FIG. 1 that where the Cr content is at least 5 at. %, the perpendicular anisotropic field Hkeff increases with an increase of the amount of Cr added, irrespective of the CoPd composition ratio.

Comparison at the same Cr content shows that when the Pd content is at least 10 at. %, the perpendicular anisotropic field Hkeff increases.

FIG. 2 illustrates the relationship between the ternary system of the CoPdCr metal thin film and the saturation magnetization Ms. The ordinate axis indicates the saturation magnetization Ms (emu/cc), the abscissa axis indicates the Cr content (at. %), and the parameter is the CoPd composition ratio.

It can be seen from FIG. 2 that the decrease of Ms when Pd is added is much smaller than that when Cr is added.

FIG. 3 illustrates the relationship between the ternary system of the CoPdCr metal thin film and the coercive force Hc in a direction perpendicular to the magnetic layer surface. In FIG. 3, the figures besides the dots are coercive forces in the perpendicular direction as indicated in the unit of Oe. Equicoercive force lines at the coercive forces of 400, 500, 600 and 700 as read from the respective values are also shown in FIG. 3.

It can be seen from FIG. 3 that as the amount of Pd added is increased, Hc tends to decrease.

EXAMPLE 7

In the vacuum chamber of the aforementioned magnetron sputtering apparatus, an alloy target having a composition of $Co_{80}Pd_{20}$ (at. %) and a diameter of 125 mm, and a Cr target were placed.

Then, argon gas was introduced into the vacuum chamber, and the sputtering of the Cr target was conducted in an atmosphere of $5 \times 10^{-3}$ Torr and at a DC electric power of 500 W to form a 1,000 Å thick nonmagnetic layer of Cr on a glass substrate.

By applying an RF electric power of 2.0 KW to the $Co_{80}Pd_{20}$ target and a DC electric power of 150 W to the Cr target, a 2,000 Å thick CoPdCr alloy thin film was formed on the above nonmagnetic layer to thereby obtain a magnetic recording medium.

EXAMPLE 8

A magnetic recording medium was produced in the same manner as in Example 7 except that no nonmagnetic layer was formed.

The magnetic characteristics of the metal thin films as obtained above were measured by the use of a vibration sample type of magnetometer. The results obtained are shown in Table 2.

TABLE 2

| | Composition of Magnetic Layer (at. %) | Thickness of Nonmagnetic Layer (Å) | Coercive Force (Oe) |
|---|---|---|---|
| Example 7 | $(Co_{80}Pd_{20})_{86}Cr_{14}$ | 1,000 Cr | 1,200 |
| Example 8 | $(Co_{80}Pd_{20})_{86}Cr_{14}$ | None | 600 |

As is apparent from the results of Table 2, the perpendicular coercivity is increased by providing a nonmagnetic layer on the thin film magnetic recording layer.

EXAMPLE 9

In the vacuum chamber of the aforementioned magnetron sputtering apparatus, an alloy target having a composition of $Co_{80}Pd_{20}$ and, a diameter of 125 mm, and a Cr target were placed.

By applying an RF electric power of 2.0 KW to the $Co_{80}Pd_{20}$ target and a DC electric power of 150 W to the Cr target, a 2,000 Å thick CoPdCr based alloy thin film was formed under a sputtering Ar gas pressure of $5 \times 10^{-3}$ Torr to obtain a magnetic recording medium.

In this case, however, the degree of vacuum, PBG, reached by evacuating the vacuum chamber before the start of sputtering, was varied. The oxygen concentration of $Co_{67}Pd_{18}Cr_{15}$ magnetic thin films obtained at the respective degrees of vacuum PBG was measured.

The oxygen concentration of the film was measured by the Auger electron spectroscopy (AES). The value of z was determined by reading the value at which the oxygen concentration became constant from the profile in the depth direction of the film of AES of the metal thin film. The results obtained are shown in Table 3.

TABLE 3

| Oxygen Concentration of Metal Thin Film (z) (at. %) | Degree of Vacuum Reached in Vacuum Chamber before Start of Sputtering (PBG) (Torr) |
|---|---|
| 0.3 | $1 \times 10^{-7}$ |
| 5.0 | $5 \times 10^{-7}$ |
| 10.0 | $1 \times 10^{-6}$ |
| 15.0 | $5 \times 10^{-6}$ |
| 20.0 | $1 \times 10^{-5}$ |

In this example, the relationship between the oxygen concentration (at. %) of the composition: $[(Co_{100-x}Pd_x)_{100-y}Cr_y]_{100-z}O_z$ and PBG was examined. With the CoPdCr base magnetic thin film of another composition, nearly the same relationship as in Table 2 was obtained.

EXAMPLE 10

Figure 5:
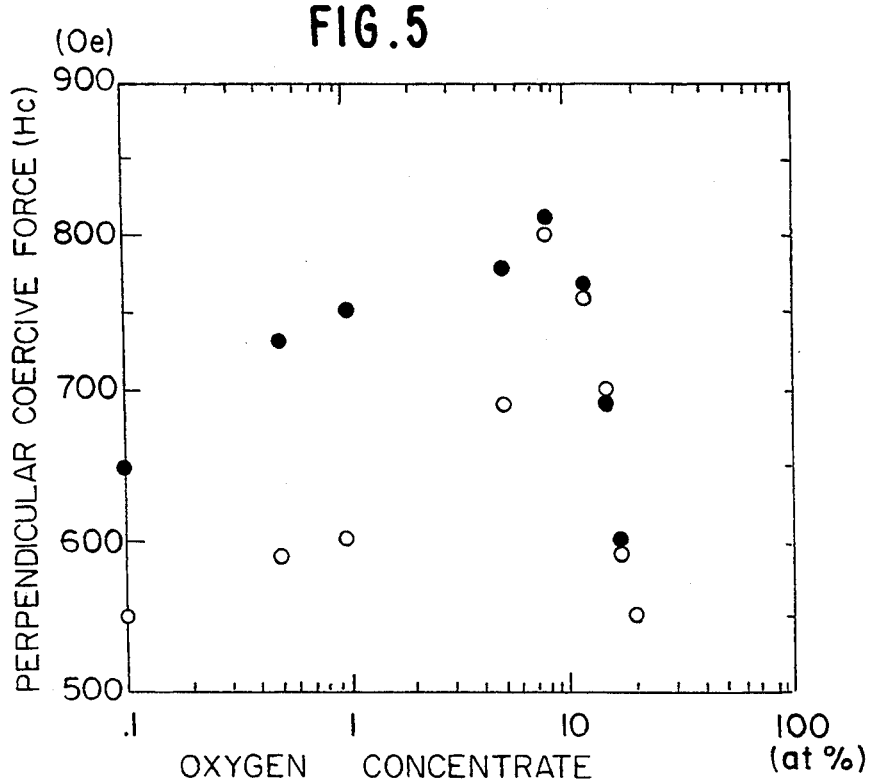
FIG. 5 shows the relation between the oxygen concentration of the CoPdCr metal thin film and the coercive force Hc in a direction perpendicular to the film surface.

In Example 9, with the degree of vacuum reached of $1 \times 10^{-7}$ Torr (PBG = $1 \times 10^{-7}$ Torr), a $Co_{67}Pd_{18}Cr_{15}$ magnetic thin film was produced. In this case, Ar containing oxygen was used as the sputtering gas. The relationship between the oxygen concentration of the film and the coercive force in the perpendicular direction relative to the film surface (Hc) for all samples obtained by changing the oxygen partial pressure during the sputtering process were measured. The results are shown in FIG. 5. In FIG. 5, the symbol ● indicates that a Ti layer having a thickness of 1,500 Å was provided between the magnetic thin film layer and the substrate, and the symbol ○ indicates that no subbing layer was provided.

As is apparent from the results, a high coercive force can be obtained by optimizing the oxygen concentration of the thin film magnetic recording layer. It was also confirmed that it was effective to provide a nonmagnetic layer.

While the invention has been described in detail and with reference to specific embodiments thereof, it will be apparent to one skilled in the art that various changes and modifications can be made therein without departing from the spirit and scope thereof.

What is claimed is:

1. A perpendicular magnetic recording medium comprising a nonmagnetic substrate having thereon a magnetic layer, wherein the magnetic layer is a metal thin film comprising mainly a composition represented by the formula: $((Co_{100-x}Pd_x)_{100-y}Cr_y)_{100-z}O_z$ wherein $10 \leq x \leq 40$, $5 \leq y \leq 25$, $0.5 \leq z \leq 15$, and x, y and z are atomic percents.

2. The perpendicular magnetic recording medium as claimed in claim 1, wherein a nonmagnetic layer is sandwiched between the nonmagnetic substrate and the magnetic layer.

3. The perpendicular magnetic recording medium as claimed claim 1, wherein the ferromagnetic metal thin film has an axis of easy magnetization in the direction substantially perpendicular to the magnetic layer surface.

4. The perpendicular magnetic recording medium as claimed in claim 1, wherein said metal thin film has a thickness of 200 to 10,000 Å.

5. The perpendicular magnetic recording medium as claimed in claim 2, wherein said nonmagnetic layer has a thickness of 200 to 10,000 Å.

6. The magnetic recording medium as claimed in claim 1, wherein the value of a perpendicular anisotropic field (Hkeff) is more than 3.5.

* * * * *